(12) United States Patent
Lemser et al.

(10) Patent No.: US 8,661,645 B2
(45) Date of Patent: Mar. 4, 2014

(54) DEVICE AND METHOD FOR CHANGING THE ROTATIONAL ANGLE POSITION OF A PNEUMATIC TIRE ON A WHEEL RIM

(75) Inventors: Matthias Lemser, Weiterstadt (DE); Georg Lipponer, Zwingenberg (DE); Karl-Heinz Steitz, Mainz (DE); Martin Rogalla, Darmstadt (DE); Andreas Peinelt, Pfungstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 347 days.

(21) Appl. No.: 13/068,249

(22) Filed: May 6, 2011

(65) Prior Publication Data

US 2011/0284170 A1    Nov. 24, 2011

(30) Foreign Application Priority Data

May 19, 2010    (DE) .......................... 10 2010 017 031

(51) Int. Cl.
*B23Q 17/00* (2006.01)
*B60C 25/132* (2006.01)

(52) U.S. Cl.
USPC .................... 29/407.1; 29/407.09; 29/407.04; 29/407.05; 29/464; 29/802; 157/1.17; 157/1.2; 157/1.26; 157/1.28; 157/5; 73/146; 901/31

(58) Field of Classification Search
USPC ......... 29/407.04, 407.05, 407.09, 407.1, 802, 29/464; 157/1.17, 1.1, 1.2, 1.26, 1.28, 5; 73/146; 901/31
See application file for complete search history.

(56) References Cited

U.S. PATENT DOCUMENTS

| 2,568,874 | A | * | 9/1951 | Vanleirsberghe | 157/1.26 |
| 2,895,519 | A | * | 7/1959 | Coats | 157/14 |
| 4,314,597 | A | * | 2/1982 | Zrostlik et al. | 157/1.11 |
| 4,451,963 | A |   | 6/1984 | Karr et al. | |
| 4,547,945 | A | * | 10/1985 | Lawson | 29/407.05 |
| 4,784,203 | A | * | 11/1988 | Weiden | 157/1.24 |
| 4,830,079 | A | * | 5/1989 | Onuma | 157/1.24 |
| 4,947,919 | A | * | 8/1990 | Timlin | 157/1.24 |
| 5,222,539 | A | * | 6/1993 | Ruppert et al. | 157/1.21 |
| 5,826,319 | A |   | 10/1998 | Colwell et al. | |
| 5,980,083 | A | * | 11/1999 | Patte et al. | 700/95 |
| 6,125,904 | A | * | 10/2000 | Kane et al. | 157/1.24 |
| 6,234,232 | B1 | * | 5/2001 | Kane et al. | 157/1.24 |
| 6,615,649 | B1 | * | 9/2003 | Kokubu et al. | 73/146 |
| 6,877,544 | B2 | * | 4/2005 | Kane et al. | 157/1.24 |
| 6,907,913 | B1 | * | 6/2005 | Keisel et al. | 157/1.2 |
| 7,048,026 | B2 | * | 5/2006 | Bonacini | 157/1.28 |

(Continued)

FOREIGN PATENT DOCUMENTS

DE         33 44 737      6/1985
DE    10 2004 006 822     9/2005

(Continued)

*Primary Examiner* — Essama Omgba
(74) *Attorney, Agent, or Firm* — Collard & Roe, P.C.

(57) ABSTRACT

A device for changing the rotational angle position of a pneumatic tire relative to a rim, on which the pneumatic tire is fitted to the rim, includes a manipulating device with a gripper adapted to be rotated by a positionable rotary drive mechanism and having radially adjustable gripper fingers with oppositely facing lift-off devices. Via the gripper it is possible to load a wheel into a clamping fixture, and following unseating of the tire beads from the clamped rim the pneumatic tire can be rotated relative to the rim through a computed angular difference.

11 Claims, 1 Drawing Sheet

(56) References Cited

U.S. PATENT DOCUMENTS

| | | | |
|---|---|---|---|
| 7,201,203 B2* | 4/2007 | Rogalla et al. | 157/16 |
| 7,654,788 B2* | 2/2010 | Rogalla et al. | 414/739 |
| 7,699,087 B2* | 4/2010 | Rogalla et al. | 157/1.1 |
| 8,448,686 B2* | 5/2013 | Rudebeck | 157/1.17 |
| 8,544,520 B2* | 10/2013 | Sotgiu | 157/1.17 |
| 2001/0000391 A1* | 4/2001 | Kane et al. | 157/1.24 |
| 2004/0221964 A1* | 11/2004 | Bonacini | 157/1.28 |
| 2007/0000616 A1* | 1/2007 | Rogalla et al. | 157/1.1 |
| 2008/0128093 A1* | 6/2008 | Rogalla et al. | 157/1.28 |
| 2009/0084506 A1* | 4/2009 | Lawson et al. | 157/1.1 |
| 2011/0197672 A1* | 8/2011 | Peinelt et al. | 73/470 |
| 2012/0267055 A1* | 10/2012 | Rogalla et al. | 157/1.24 |
| 2013/0269880 A1* | 10/2013 | Corghi | 157/1.24 |

FOREIGN PATENT DOCUMENTS

| | | | |
|---|---|---|---|
| DE | 10 2007 063 025 | 7/2009 | |
| EP | 1 564 028 | 8/2005 | |
| EP | 2 075 564 | 7/2009 | |
| EP | 2 236 321 | 10/2010 | |
| WO | WO 9942309 A1 * | 8/1999 | B60C 25/135 |

* cited by examiner

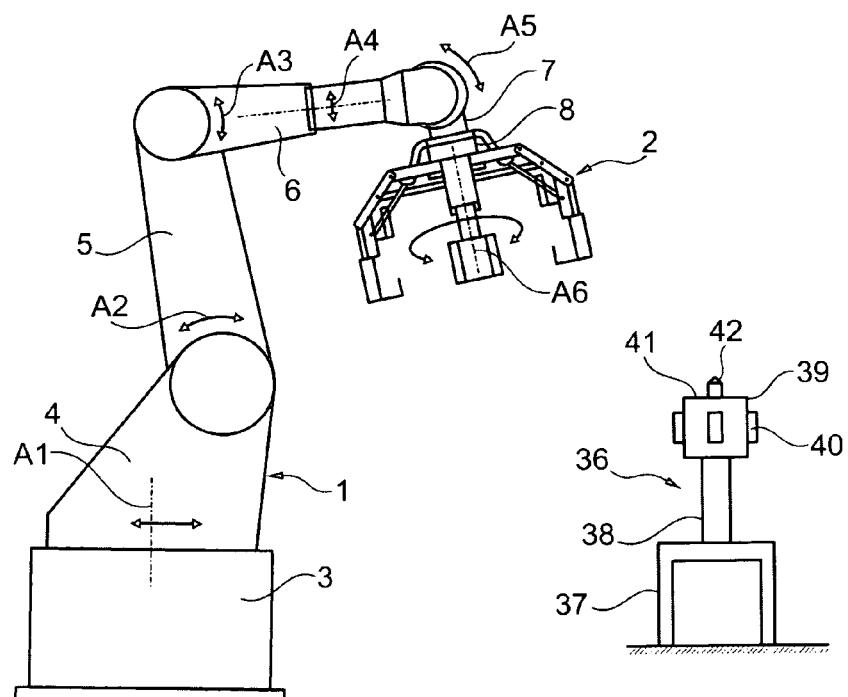
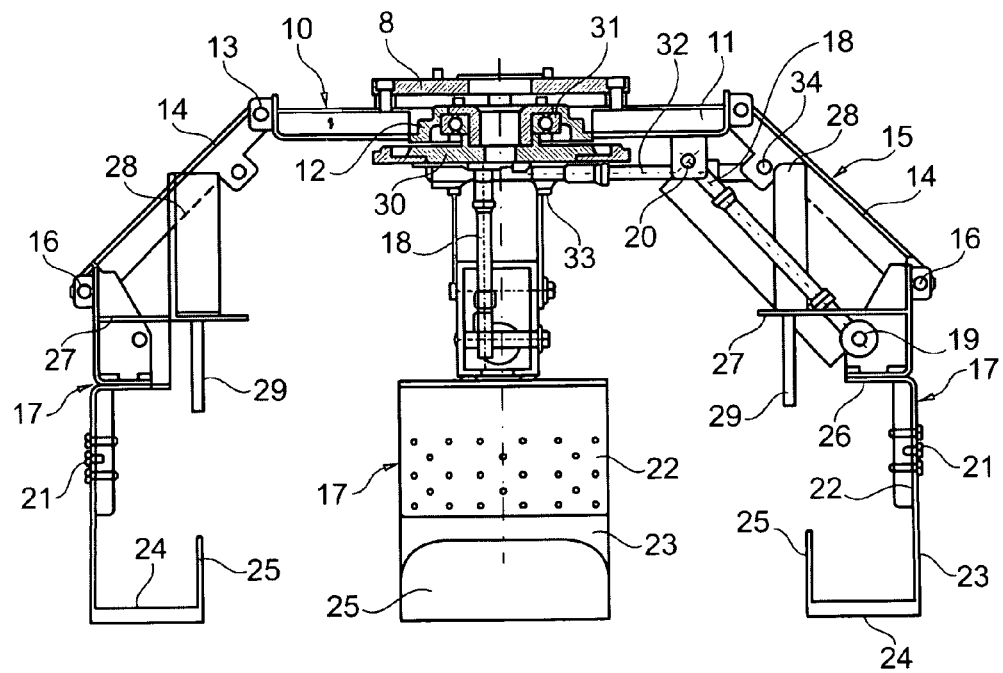

DEVICE AND METHOD FOR CHANGING THE ROTATIONAL ANGLE POSITION OF A PNEUMATIC TIRE ON A WHEEL RIM

CROSS REFERENCE TO RELATED APPLICATIONS

Applicants claim priority under 35 U.S.C. §119 of German Patent Application No. 10 2010 017 031.3 filed May 19, 2010.

FIELD OF THE INVENTION

This invention relates to a device and a method for changing the rotational angle position of a pneumatic tire relative to a wheel rim, with the pneumatic tire being fitted to the rim and resting with its tire beads against seating surfaces of the rim. The device comprises a clamping fixture for holding the rim, a measuring device for measuring and storing the rotational angle position of markers on the rim and on the pneumatic tire, an evaluating and control unit which computes an angle of rotation, and a positionable rotary drive mechanism which is controllable by the evaluating and control unit.

DESCRIPTION OF PRIOR ART

Devices of the type referred to are used for lining the pneumatic tire up with the wheel rim, which is referred to as matching. Matching is a process used in tire fitting to optimize the true running properties of the wheel. In manufacture, markers referred to as match points are applied to the tires and the wheel rims to identify the extreme positions of the radial run-out measured. On the pneumatic tire the match point identifies the maximum of the first harmonic radial-force variation, and on the wheel rim the position of the radial run-out with the smallest radius. When the marker on the tire is lined up with the marker on the rim, the true-running properties of the wheel attain a favorable value.

In volume production of vehicle wheels, matching of tire and rim is performed if so required to satisfy the quality demands. To perform the matching operation, DE 10 2004 006 822 A1, for example, discloses a machine on which the rim of a fitted wheel is clamped by means of a clamping unit, the markers on tire and rim are sensed by a camera system, the tire beads are detached from the rim by forcing in the tire sidewalls, following which the rim is rotated through a calculated angle of rotation by means of the rotary clamping unit so that the markers on tire and rim lie on the same rotational angle position.

SUMMARY OF THE INVENTION

It is an object of the present invention to provide a device of the type initially referred to, which affords economy of manufacture, ease of integration into a facility for the mass production of vehicle wheels and which simplifies the matching-related conveying tasks.

According to the present invention, the device for changing the rotational angle position of a pneumatic tire relative to a wheel rim, in which the pneumatic tire is fitted to the rim and rests with its tire beads against seating surfaces of the rim, comprises a clamping fixture for holding the rim, a measuring device for measuring and storing the rotational angle position of markers on the rim and on the pneumatic tire, an evaluating and control unit which computes an angle of rotation, a positionable rotary drive mechanism which is controllable by the evaluating and control unit, and a manipulating device with a gripper movable relative to the clamping fixture and having radially adjustable gripper fingers, with the gripper fingers having oppositely facing lift-off devices for urging the tire beads away from the seating surfaces of the rim.

To change the rotational angle position of the pneumatic tire, it is possible with the device of the invention to load a wheel into a clamping fixture for holding the rim, to detach the tire by pushing off the tire beads after the rim is clamped and held in position, then to rotate the wheel and transfer it, for example, to an inflating station or an outgoing conveyer unit. On the other hand, it is also possible for the device of the invention to be used to advantage without applying the conveying function of the gripper when suitable conveying devices are present to load the wheel into, and unload it from, the clamping fixture. The device of the invention is simple because the movement functions of the gripper and the manipulating device are also utilized for performing the matching operation.

Advantageously, the clamping fixture is fixed in place and the rotary drive mechanism enables the gripper to be positioned relative to the manipulating device about a central axis. This permits a very simple configuration of the clamping fixture and the use of prior installed clamping fixtures which are not equipped with a positionable rotary drive mechanism.

The manipulating device may be a robot with a jointed arm movable about several axes and having the gripper arranged at is free end. Furthermore, the rotary drive mechanism designed to rotate the gripper may be arranged at the free end of the jointed arm. Alternatively, the gripper may be prevented from rotating about its central axis, and the clamping fixture may be rotatable and positionable by the rotary drive mechanism. The latter variant is advantageous when a manipulating device is used which is not equipped with a suitable rotary drive mechanism for rotating and positioning the gripper.

According to another proposal of the invention, the lift-off device may include rigid lift-off elements, with the gripper being movable up against the rim axially by means of the manipulating device for unseating a tire bead. This is a low-cost configuration using the movability and force of the manipulating device to advantage.

Furthermore, at least the lift-off devices arranged on one side of the tire may include lift-off elements movable up against the tire by means of actuators. The use of these movable lift-off elements not only enables a tire bead to be disengaged from the seating surface of the rim but also enables the tire, in cooperation with the lift-off elements, to be held locked against rotation on the opposite side of the tire in such a way that its rotational angle position relative to the gripper is not changed when the gripper or the rim is rotated.

In an advantageous embodiment, the gripper includes a body and at least two gripper arms movable radially to the central axis of the gripper, with the gripper arms being coupled to a synchronizing device which synchronizes the radial movement of the gripper arms. It is thereby ensured that the gripper, on opening and closing its gripper arms, does not alter its central position relative to the held wheel or tire, which simplifies the precise control of the gripper movement considerably.

The gripper fingers are preferably arranged at the free ends of movable gripper arms and include retaining plates arranged parallel to the central axis of the gripper and having portions configured for engagement with the tread of a pneumatic tire. According to the invention, the free ends of the retaining plates may include a bend which extends at right angles to the gripper centre and is provided with preferably rigid lift-off elements.

Moreover, the gripper fingers may include plates extending at a distance from the bends and parallel thereto in the direction of the gripper centre, with actuators and lift-off elements movable thereby being attached to said plates.

BRIEF DESCRIPTION OF THE DRAWINGS

The present invention will be explained in greater detail in the following with reference to one or more embodiments illustrated in the accompanying drawing. In the drawing, FIG. 1 is a side view of a device of the invention including manipulating robot, gripper and clamping fixture; and FIG. 2 is a sectional view of the gripper of the device of FIG. 1.

DETAILED DESCRIPTION OF THE EMBODIMENTS

The device shown in FIG. 1 comprises a manipulating robot 1 and a gripper 2 movable thereby which is configured for gripping and holding pneumatic tires. The manipulating robot 1 is composed of a stationary base 3 on which a carousel 4 having a swivel 5, an arm 6 and a robot hand 7 rotates about a vertical axis A1. The swivel 5 is mounted for rotation on the carousel 4 about a horizontal axis A2, and the arm 6 is mounted for rotation on the swivel 5 about a horizontal axis A3. The arm 6 is comprised of two parts which are rotatable relative to each other about an axis A4 extending in the longitudinal direction of the arm 6. The robot hand 7 is connected to the arm 6 for rotation about an axis A5 extending transversely to the longitudinal axis of the arm 6. The robot hand 7 has at its free end a flange 8 rotatable about an axis A6. All the axes A1 to A6 of the manipulating robot 1 are adapted to be driven by controlled servomotors. Integrated into the servomotors are brakes and resolvers for measuring the angle of rotation. The robot is equipped with a freely programmable controller by means of which each of the aforementioned axes is individually movable into any angular position and lockable therein.

The gripper 2 shown in FIG. 2 in greater detail has a cruciform body 10 with four arms 11 extending radially outwardly from a central annular body 12. Pivotally mounted on the radially outer ends of the arms 11 by means of rotary joints 13 are outer links 14 of gripper arms 15. Gripper fingers 17 are pivotally mounted on the free ends of the links 14 by means of rotary joints 16. The axes of the rotary joints 13 and 16 of each link 14 are parallel and extend tangentially relative to the central axis of the gripper 2 and in a radial plane. On the side of the links 14 facing the gripper centre, inner links 18 are arranged at a parallel distance thereto, which have one end connected to a gripper finger 17 by a rotary joint 19 while the other end is connected to an arm 11 by a rotary joint 20. The distance between the rotary joints 19 and the axis of the rotary joints 16 equals the distance between the rotary joints 20 and the axis of the rotary joints 13. Moreover, the relative distance of the rotary joints 19 and 20 is substantially equal to the relative distance of the axes of the rotary joints 13 and 16. As a result, the links 14, 18 form a pivotal parallel guide by means of which the gripper finger 17 connected with the links maintains its predetermined orientation to the central axis of the gripper 2 when the gripper 2 is opened and closed.

Each of the gripper fingers 17 includes a retaining plate 21 aligned substantially parallel to the central axis of the gripper 2 and extending in a direction away from the axis of the rotary joint 16. The retaining plate 21 has a studded portion 22 close to the axis for abutment with the tread of a pneumatic tire, and a portion 23 remote from the axis. The free end of the portion 23 is provided with a bend 24 extending at right angles towards the gripper center and carrying a plate-shaped lift-off element 25 extending towards the body. Formed on the mounting end of the retaining plate 21 is a seating surface 26 which extends radially inwardly and perpendicularly thereto and enables the gripper to take support upon a sidewall of a pneumatic tire.

Secured to the gripper fingers 17 in close proximity to the rotary joints 16, 19 are furthermore plates 27 which extend in the direction of the gripper centre and carry actuators 28 and lift-off elements 29 movable thereby in the direction of the lift-off elements 25. The actuators 28 may be pneumatic cylinders, hydraulic cylinders or electrically powered linear motors.

To open and close the gripper it is necessary for the gripper arms 15 to be moved towards or from each other in synchrony. To produce this synchronous movement, a rotary disc 30 is provided which is mounted for rotation in the central opening of the annular body 12 by means of a four-point rolling-contact bearing 31. The disc 30 is connected to each gripper arm 15 by a rod-shaped coupling member 32. The coupling members 32 are of equal length, mounting on their ends joints 33, 34 having at least two degrees of freedom, in particular ball-and-socket joints. The joint 33 secures the coupling members 32 to the disc 30. In this arrangement, the joints 33 are arranged at an angular distance of 90° and at the same distance from the axis of rotation of the disc 30. The joints 34 secure the coupling members 32 to the outer links 14 at a distance from the axis of the rotary joints 13. When the disc 30 is rotated, the coupling members 32 move in radial direction relative to the adjacent arms 11 of the body 10, as a result of which the gripper arms 15 mounted on the arms 11 perform a pivotal movement in the corresponding direction.

In order to grip a wheel, the gripper 2 is moved to an open position by controlled rotation of the disc 30 by means of a servo drive mechanism not shown, in which position the relative distance of the oppositely facing lift-off elements 25 is greater than the outer diameter of the wheel's pneumatic tire to be gripped. Owing to the parallel guide of the gripper fingers 17, the retaining plates 21 are aligned parallel to the gripper central axis, regardless of the opening position of the gripper 2, so that they come to rest uniformly against the circumferential surface of the tire when the gripper 2 is closed. In order to bring the retaining plates 21 into contact with the tire, the servo drive mechanism rotates the disc 30 in the opposite direction. This causes the gripper arms 15 to move synchronously in the direction of the central axis of the gripper 2 until they reach a position in which the seating surfaces 26 and the retaining plates 21 make engagement with the portions 22 on the pneumatic tire.

The gripper 2 is arranged on the robot hand 7 in such a way as to enable it to be rotated relative to the robot hand 7 about its central axis congruous to axis A6 and to be positioned at the correct angle of rotation with precise accuracy. To this effect, the annular body 12 of the gripper 2 is secured to the flange 8 of the robot hand 7, which flange is movable by means of the servomotor arranged on the robot hand 7 into any desired angular position and can be locked in these positions. In this way it is possible for the gripper 2 to rotate a tire held by it about its axis of rotation into a specific angular position, rotating, for example, a match point marked on the tire into the same angular position which a match point occupies on the assigned rim.

A clamping fixture 36 for clamping a rim is shown in FIG. 1 schematically. Arranged on a table 37 is a column-type post 38 mounting on its upper end a chuck 39 having radially movable jaws 40. The chuck has on its upper side a seating surface 41 and a central locating mandrel 42 engaging in the rim hole. The jaws 40 are actuated by a pneumatic reciprocating cylinder arranged in the post 38 via an inner lying chucking wedge and engage the inner surface of the rim dish.

With the device described, the process referred to as matching can be performed by selectively changing the angular position of a pneumatic tire relative to the rim on which it is mounted as follows:

The wheel comprised of rim and pneumatic tire is initially loaded into a clamping fixture for clamping and holding the rim. The rim clamping fixture may involve a simple chuck having several elastically deformable plastic jaws pressed on the inside against the rim dish. It will be understood, of course, that other rim clamping fixtures may also be used, for example, of the type which clamp the rim in the centre hole. Loading the wheel into the clamping fixture may be performed by means of the gripper 2 and the manipulating robot 1, but other loading devices, for example, a vertical step conveyer, may also serve this purpose.

Once the rim is held clamped, a measuring device, for example, a camera system, measures the position of the match points on tire and rim and calculates the angular difference between the match points by means of an evaluating and control unit. In cases where the wheel was previously loaded into the clamping fixture by means of the gripper 2, it is necessary to remove the gripper 2 from the wheel for this measurement.

In the next step, the manipulating robot 1 guides the gripper 2 centrically above the wheel and in axial direction into a position in which the lift-off elements 25, 29 of the gripper 2 are outside the lateral boundary planes of the wheel. By synchronous movement of the gripper arms 15 and gripper fingers 17 in the direction of the gripper centre, the gripper is adjusted to the diameter of the rim such that the lift-off elements 25, 29 are spaced from the rim edge in a position suitable for lift-off. The gripper 2 is then moved by the manipulating robot 1 in an axial direction such that the body 10 of the gripper 2 moves a predetermined distance away from the wheel. This causes the rigid lift-off elements 25 to make engagement with the adjacent tire bead, urging it away from its seating surface on the rim. As soon as the lift-off position is reached, the gripper stands still, and the actuators 28 of the lift-off elements 29 are set in operation next. This causes the lift-off elements 29 to unseat the adjacent second tire bead from its seating surface on the rim. The pneumatic tire is then held solely by the gripper 2 with the aid of the lift-off elements 25, 29 and can therefore be rotated easily by means of the gripper 2.

In the next step, the evaluating and control unit drives the servomotor in the robot hand 7, and the gripper 2 is rotated about the angular difference previously calculated on account of the detected match points, so that after rotation both match points occupy the same angular position. With the gripper 2 in this position, the actuators 28 are reversed to return the lift-off elements 29 to their initial position. At the same time, the manipulating robot 1 moves the gripper 2 back into the initial position in which the rigid lift-off elements 25 are lifted clear of the pneumatic tire. For a subsequent check of the matching operation, the gripper 2 is reopened and removed from the wheel by the manipulating robot 1. If the check measurement finds that the result of the matching operation is correct, the clamping fixture is released from the rim and the wheel is unloaded from the clamping fixture, which task may be performed by the gripper and the manipulating robot or any other conveying device.

The device described distinguishes itself by a straightforward and economical machine design which utilizes the functions of a manipulating robot of conventional construction, enabling the loading of the wheel into the matching station and the movement functions in the matching station to be performed with the same device, that is, the gripper moved by the manipulating robot. To clamp the rim, a simple clamping fixture without elaborate drive mechanism is sufficient, as it also finds application in tire fitting.

What is claimed is:

1. A device for changing the rotational angle position of a pneumatic tire relative to a wheel rim, with the pneumatic tire being fitted to the rim and resting with its tire beads against seating surfaces of the rim, comprising
a clamping fixture for holding the rim,
a measuring device for measuring and storing the rotational angle position of markers on the rim and on the pneumatic tire,
an evaluating and control unit which computes an angular difference,
a positionable rotary drive mechanism which is controllable by the evaluating and control unit, and
a manipulating device with a gripper movable relative to the clamping fixture and having a central axis and a plurality of radially adjustable gripper fingers, each of said gripper fingers having oppositely facing lift-off devices for urging the tire beads away from the seating surfaces of the rim, and wherein the clamping fixture is fixed in place and the rotary drive mechanism enables the gripper to be rotated and positioned relative to the manipulating device about its central axis.

2. The device according to claim 1, wherein the manipulating device is a robot with a jointed arm movable about several axes, and the gripper is arranged at a free end of the jointed arm.

3. The device according to claim 2, wherein the rotary drive mechanism is arranged at the free end of the jointed arm and is designed to rotate the gripper about its central axis.

4. The device according to claim 1, wherein the lift-off devices include rigid lift-off elements at least on one side of the tire, and wherein the gripper is movable up against the rim axially via the manipulating device for unseating a tire bead.

5. The device according to claim 1, wherein at least the lift-off devices arranged on one side of the tire include lift-off elements movable by means of actuators.

6. The device according to claim 1, wherein the gripper includes a body and at least two gripper fingers movable radially to the central axis of the gripper, said gripper fingers being coupled to a synchronizing device which synchronizes the radial movement of the gripper fingers.

7. The device according to claim 1, wherein the gripper fingers are arranged at the free ends of movable gripper arms and include retaining plates arranged parallel to the central axis of the gripper and having portions configured for engagement with the tread of a pneumatic tire.

8. The device according to claim 7, wherein the rigid lift-off elements are arranged at free ends of the retaining plates.

9. A method of changing the rotational angle position of a pneumatic tire relative to a wheel rim, with the pneumatic tire being fitted to the rim and resting with its tire beads against seating surfaces of the rim, comprising the following steps:
loading a wheel comprising a rim and a pneumatic tire into a clamping fixture,
clamping and holding the rim fixed in place in the clamping fixture;
measuring and storing the angular position of markers on the rim and on the pneumatic tire via a measuring device;
calculating an angular difference via an evaluating and control unit;

gripping the wheel with a plurality of gripper fingers of a gripper which is arranged on a manipulating device and includes a positionable rotary drive mechanism and lift-off devices for unseating the tire beads from the rim;

urging the tire beads away from the seating surfaces of the rim via the lift-off devices at each of the gripper fingers;

rotating the pneumatic tire through the calculated angular difference via the gripper through control of the rotary drive mechanism of the gripper by the evaluating and control unit;

returning the lift-off devices to the initial position and releasing the clamping fixture; and unloading the wheel from the clamping fixture.

10. The method according to claim 9, wherein the wheel is loaded into the clamping fixture by means of the gripper.

11. The method according to claim 9, wherein unseating of a tire bead is effected by raising the gripper.

* * * * *